United States Patent [19]

Priaroggia et al.

[11] 4,415,764

[45] Nov. 15, 1983

[54] SUBMARINE ELECTRIC CABLE WITH TUBULAR STIFFENING MEANS AND METHOD OF APPLYING THE STIFFENING MEANS

[75] Inventors: Paolo G. Priaroggia; Giuseppe Bianchi, both of Milan; Angelo Sala, Merate, all of Italy

[73] Assignee: Societa' Cavi Pirelli S.p.A., Milan, Italy

[21] Appl. No.: 318,258

[22] Filed: Nov. 4, 1981

[30] Foreign Application Priority Data

Nov. 12, 1980 [IT] Italy ............................... 25928 A/80

[51] Int. Cl.³ .......................... H02G 9/02; H02G 1/10; H01B 7/24
[52] U.S. Cl. ..................................... 174/37; 138/110; 138/120; 174/136; 405/158
[58] Field of Search ............... 174/37, 135, 136, 68 C, 174/70 R, 111; 138/110, 120; 254/134.3 SC; 405/157, 158, 169, 166, 167, 168

[56] References Cited

U.S. PATENT DOCUMENTS

| | | | |
|---|---|---|---|
| 1,822,624 | 9/1931 | Hoeftmann | 174/136 X |
| 3,762,982 | 10/1973 | Whittington | 138/110 X |
| 3,813,476 | 5/1974 | Priaroggia | 174/37 |
| 3,813,477 | 5/1974 | Fischer | 174/68 C X |

FOREIGN PATENT DOCUMENTS 53-139198 12/1978 Japan ................................. 174/136

Primary Examiner—Laramie E. Askin
Attorney, Agent, or Firm—Brooks, Haidt, Haffner & Delahunty

[57] ABSTRACT

A submarine electric cable installation in which the cable is protected from damaging stresses to which it would be subjected if it were permitted to be suspended between projections on the water bottom by enclosing the portion of the cable which would normally engage the projections with a tubular stiffening means, the stiffening means having a rigidity greater than the rigidity of the cable and providing a space between it and the cable for cooling water flow. The stiffening means may comprise one or more tube and, preferably, comprises a plurality of tubes having their ends secured to the adjacent ends of other tubes, each tube comprising a pair of C-shaped shells with annular corrugations and secured together. Also, a method of applying the tubes to the cable in which the tubes are applied to the cable, as it is laid, between the laying ship and the surface of the water.

17 Claims, 5 Drawing Figures

SUBMARINE ELECTRIC CABLE WITH TUBULAR STIFFENING MEANS AND METHOD OF APPLYING THE STIFFENING MEANS

BRIEF DESCRIPTION OF THE INVENTION

The present invention relates to a submarine electric cable. More particularly, it relates to a submarine electric cable provided with a tubular stiffening-means at portions thereof corresponding to the uneven stretches which are found at the bottom of the body of water where the cable is laid.

The present invention also relates to a method for disposing said tubular stiffening-means around the cable during the laying operation.

As is known, one of the problems arising with regard to the laying of a submarine electric cable is due to the roughness and irregularities found at the bottom of a body of water (spurlike projections, dips, hollow, etc.).

This uneven surface at the bottom, practically speaking, comprises points where the cable itself remains "suspended", and in correspondence to such points, forces, which tend to bend the cable, are manifested.

In many instances, such forces could become dangerous because they bend the cable beyond the minimum permissible bending radius, i.e., of a magnitude which would cause damage to and irreversible deformations of the cable. Such forces which tend to bend the cable result in the well-known undesirable mechanical and electrical consequences (distortions in the protective covering, mechanical impairments of the insulation etc.). Solely by way of example, said minimum permissible bending radius is about 3 meters for submarine cables having large dimensions (with an outer diameter = 150 mm), and about 1.5 meters for submarine cables having small dimensions (with an outer diameter = 60 mm).

This situation is worse in those underwater zones where strong currents are found because such currents subject the "suspended" cable to further strains.

In order to eliminate these risks, the protective covering could be reinforced and stiffened. This, in the technique generally in use for submarine cables, consists, usually, of an armoring formed by at least one binding with elongated metallic elements.

However, a very rigid armoring, that is, an armoring able to withstand without any deterioration all the stresses that are manifested in cables laid upon uneven bottoms, does not possess a flexibility that is sufficient for winding the cable itself over a bobbin, or in coils. This, in itself, would, in fact, render the cable laying operation incapable of being performed.

Moreover, the above-mentioned reinforcing and stiffening armoring is disposed throughout the entire length of the cable which is laid. This fact, in itself, constitutes a useless expense in quite frequent cases where just a very few irregular stretches are to be found at the bottom of the body of water concerned.

Another solution may consist in positioning fixed supports at the bottom upon which the cable can be arranged. This solution may, for example, be realized by arranging flexible containers in appropriate positions at the bottom. These containers are, thereafter, injected with a liquid cement which later hardens. Such technique, which is widely in use in submarine pipe-laying systems, is not as feasible in the case of electric cables because of the lack of rigidity of the cable itself, which would require a considerable number of supports to be positioned, as well as because these supports, themselves, would not offer any adequate guarantee against the cable being eventually shifted about through the action of the underwater currents at the bottoms.

A further solution could be that of levelling the floor, or bottom, of the body of water concerned by demolishing the more dangerous obstructions which are present. However, as can easily be understood, a solution such as this is neither simple nor economical, especially when it involves eliminating the widespread surface roughnesses of a small dimension.

The object of the present invention is to overcome the above-cited drawbacks and disadvantages. Said object comprises, in practice, predisposing a submarine cable which, when laid on the uneven tracts at the bottoms, is not subject to any dangerous flexing, i.e., any curving which leads to a bending radius which is less than the minimum permissible bending radius for the type of cable in question. Said object also comprises establishing a simple and economical method of realization of said submarine cable.

In particular, the object of the present invention is a submarine electric cable which comprises at least one insulated and screened conductor and a protective covering and which is placed at the bottom of a body of water where both smooth and uneven tracts are to be found, characterized by the fact of comprising a tubular stiffening-means disposed around portions of said cable corresponding to each of said uneven tracts, said tubular stiffening-means having a greater rigidity than the rigidity of the said cable.

In the preferred form of the invention, said stiffening-means is constituted by a material having a specific weight which is approximately the same as that of the water.

A further object of the present invention is a method for disposing a tubular stiffening-means around a submarine electric cable, characterized by the fact that said tubular means is assembled, during the laying operation, on that tract of cable which is between the ship's cable capstan and the surface of the body of water.

BRIEF DESCRIPTION OF THE DRAWINGS

The present invention will be better understood from the detailed description thereof, given in connection with the accompanying drawing sheets. The figures of the drawings represent schematically.

DETAILED DESCRIPTION OF THE INVENTION

Figure 1:
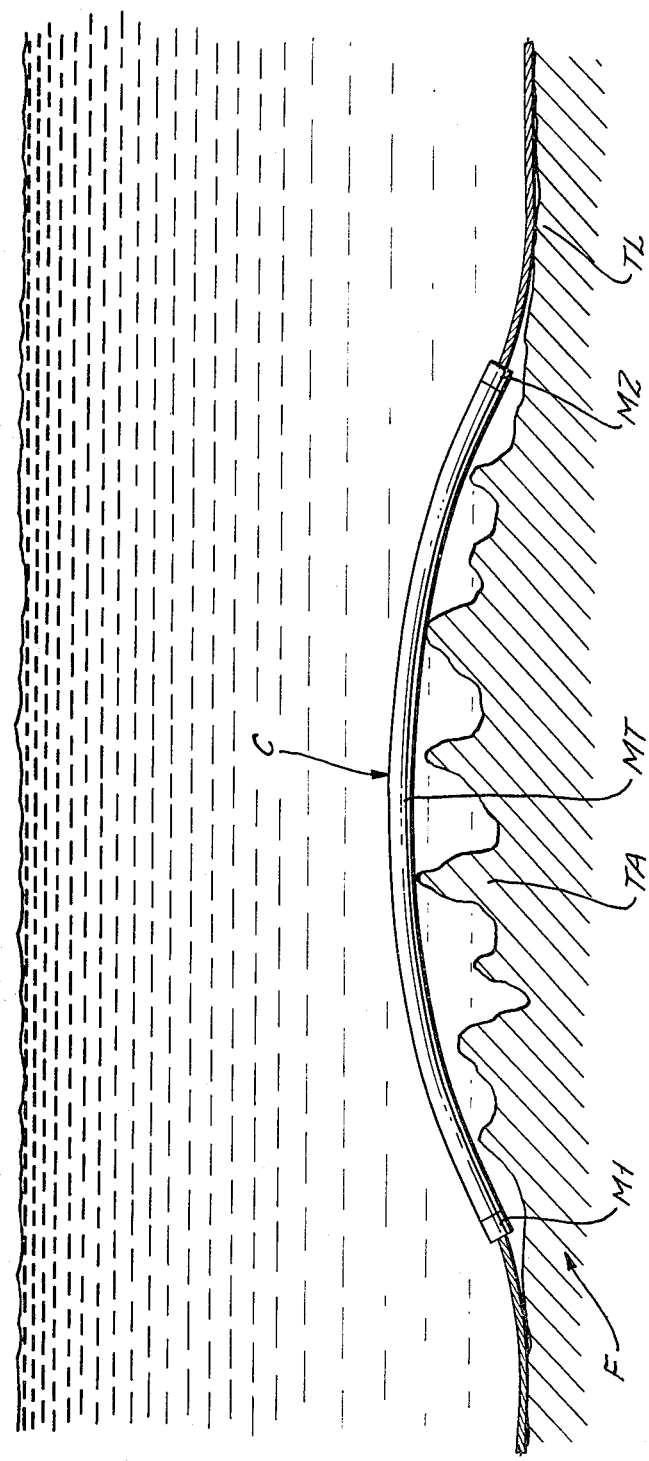
FIG. 1 A slide elevation view of a length of submarine electric cable, according to the present invention, as laid at the bottom of a body of water and provided with a tubular stiffening-means.

FIG. 1 shows a length of submarine electric cable C as placed on the bottom F which presents an uneven tract TA and a smooth tract TL.

The cable C, which comprises at least one insulated and screened conductor and a protective covering (which can also be an armoring made of elongated metallic elements), is provided, at the portion thereof corresponding to said uneven tract TA, with a tubular stiffening-means MT, delimited by a first and a second clamp $M_1$ and $M_2$. Said first and second clamps are clenched onto the armoring of the cable and present an outer diameter which is at least equal to the outer diameter of said tubular stiffening-means MT in such a way that the latter cannot slide along the armoring of the cable.

According to the present invention, said tubular stiffening-means MT possesses a greater rigidity than that of the cable. By the term "ridigity", as used here, it is intended to refer to the capacity to resist mechanical deformation in the presence of stresses, and in particular in the presence of bending stresses.

The bending of the tubular stiffening-means MT is, at equal stresses, less than the bending of the cable in the embodiment of the invention. In other terms, according to the invention, said tubular stiffening-means MT presents, at said uneven tract, a bending radius which is greater than the minimum permissible bending radius for the cable itself. In this manner, the elements constituting the submarine cable (conductor, screen, insulation, protective covering) are not subject to flexing which, in any case, go beyond safety limits.

It has, moreover, been found by experiment that the best results are had when the specific weight of the material constituting said stiffening-means MT is approximately equal to that of water. Therefore, plastic materials are preferred, such as, for example, polyester reinforced with fiberglass which presents good mechanical properties when the content of glass (fibers) is such that the specific weight is around about 1.5.

Among the metallic materials, the only tolerable one is aluminum which has a specific weight of 2.8 but which diminishes when treated with anti-corrosive substances, such as, for example, bitumens or the like substances, all having a specific weight which is less than 1.00.

Preferably, said tubular stiffening-means MT has a greater inner diameter than the outer diameter of said cable therein. The latter is maintained inside of said tubular stiffening-means, and co-axially with it, by means of special centering elements. Therefore, between the outer cable wall and the inner wall of the tubular stiffening-means MT, there is an interspace which is occupied by the water of the surrounding ambient.

Figure 2:
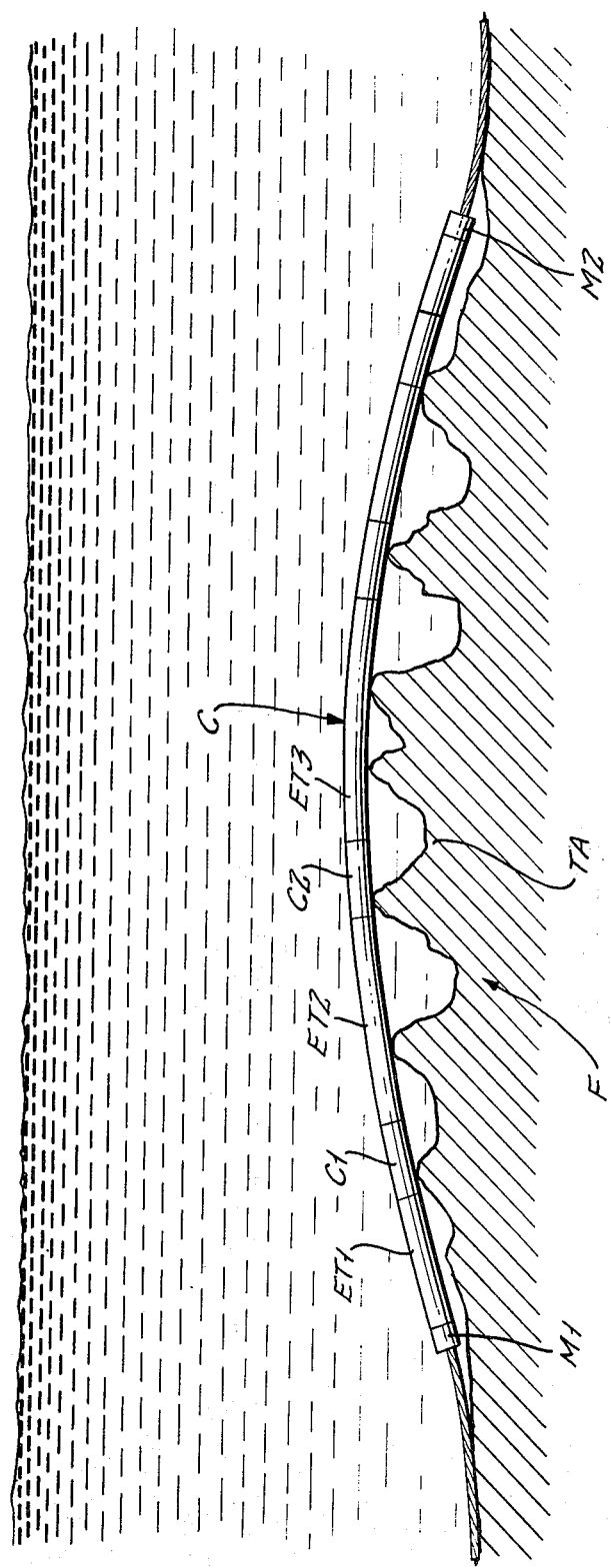
FIG. 2 A view similar to FIG. 1, of a length of submarine electric cable, according to the present invention, provided with a tubular stiffening-means which comprises a plurality of tubular elements.

The water, which can flow in the interspace by passing through special openings (for example, openings in the clamps $M_1$ and $M_2$), permits a rapid and effective dispersion of the heat emitted by the cable during operation. In instance where said uneven tract TA is quite long (see FIG. 2), it is preferable that said tubular stiffening-means comprises a plurality of tubular elements ($ET_1$, $ET_2$, $ET_3$, etc.) connected to each other in series by means of appropriate connecting means, e.g. $C_1$ which connects the contiguous tubular elements $ET_1$ and $ET_2$, $C_2$ which connects the contiguous tubular elements $ET_2$ and $ET_3$, etc.) Said connecting means are, preferably, "collars" which bind together the adjacent extremities of the tubular contiguous elements.

According to the present invention, each of said tubular elements which forms said tubular stiffening-means has a greater rigidity than that of the cable itself. Owing to this condition, said tubular stiffening-means can comprise at its intermediate part one or several tubular elements having the same rigidity, and at its terminal parts, one or several tubular elements having a rigidity which is lower and progressively diminishing, starting from said intermediate part, i.e., for the purpose of permitting the tubular stiffening-means to assume the most suitable configuration possible in the zone between a smooth tract and an uneven one, and thence, to join up, with continuity, with the cable which presents a lower rigidity.

Figure 3:
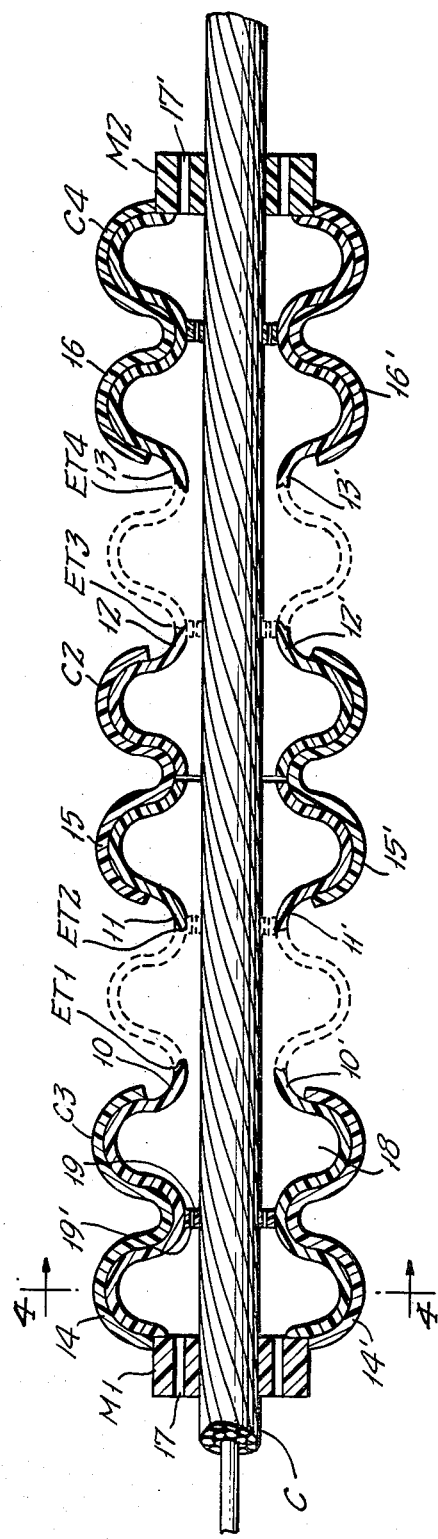
FIG. 3 The longitudinal section of a preferred embodiment of the tubular stiffening-means according to the present invention.

FIG. 3 shows the longitudinal section of a preferred embodiment of said tubular stiffening-means which comprises a plurality of tubular elements (such as, $ET_1$, $ET_2$, $ET_3$, $ET_4$) which are placed in series and which is delimited by a first and a second clamp $M_1$ and $M_2$. Each one of said tubular element is comprised of a first and second shell (respectively: 10, 10'; 11, 11'; 12, 12'; 13, 13') which have C-shaped cross-sections and annular corrugations (that is, corrugations parallel to said cross-section). Said shells, which constitute said tubular elements, are held together by "collars" (such as $C_2$, $C_3$, $C_4$). Each one of said collars comprises a first and a second semi-collar (respectively: 14, 14'; 15, 15'; 16, 16') having C-shaped cross-sections and annular corrugations (that is, corrugations which are parallel to said cross-section), and each collar is also provided with connecting means (not shown in FIG. 3). The geometric characteristics of the corrugations of said semi-collars are similar to the geometric characteristics of the corrugations of the shells and are such as to permit the inner reliefs of the corrugations of said semi-collars to become disposed (as indicated in FIG. 3) in the outer depressions of the corrugations of said shells.

The opposing and the connection of the two semi-collars disposed around the extremities of the two opposite shells permits, on the one hand, the joining together of their two shells so as to form a tubular element and, on the other hand, the joining together of the two contiguous shells. The collars $C_3$ and $C_4$ just have the function of holding together, respectively, the shells 14, 14' and 16, 16' for forming the tubular elements $ET_1$ and $ET_4$. The collar $C_2$ instead, has the function, apart from that of joining to each other the shells 11, 11' and 12, 12', of connecting to one another the contiguous shells 11, 12 and 11', 12'. For allowing this result, it is necessary for the corrugations of the semi-collars 15 and 15', which compose the collar $C_2$, to be simultaneously engaged with the terminal corrugations of the shells 11, 11' and 12, 12' which compose the contiguous tubular elements $ET_2$ and $ET_3$.

Said first and second clamps $M_1$ and $M_2$ are similar to the devices commonly used for the fastening of the electric cables, e.g., the joining-up etc. However, in the case of the present invention, said clamps must have, in the zone of application, an outer diameter which is at least equal to the outer diameter of said tubular elements so as to impede the latter from sliding along the cable.

In fact, the inner diameter of each tubular element, corresponding to the depressions of the corrugations, is greater than the outer diameter of the cable. Therefore, between the outer cable wall and inner wall of the tubular elements, there is established an interspace 18 which is occupied by the water from the surrounding ambient.

The cable is sustained inside of the tubular elements and coaxially to them by appropriate centering elements 19 which, in simple cases, can be protuberances of the inner wall of the shells which form the tubular elements.

Said centering elements must be of a number such as to support the cable in a position co-axial to said tubular stiffening-means throughout its entire length. Moreover, they must be provided with openings 19' which allow for the movement of the water inside the interspace 18.

The water can flow into the interspace 18 through the openings 17, 17' in the clamps $M_1$ and $M_2$.

The usage of tubular elements, provided with corrugations (in particular, but not exclusively, annular), permits the achievement of certain practical advantages.

In the first space, it permits the obtaining of a tubular element endowed with a good mechanical resistance with regard to bending as well as to pressures. This characteristic is necessary for supporting tracts of cable when "suspended".

In the second place, it permits the connecting, in series, of contiguous tubular elements in a manner which is extremely simple and rapid.

The material which constitutes said tubular elements and the said collars can be varied. A preferred solution (both, for the tubular elements, as well as for the collars) is, as stated above, the use of polyester reinforced with fibreglass and having a specific weight of the order of 1.5. The rigidity of each tubular element may be changed according to the specific requirements by approximately establishing the composition of the resin, the thickness of the tubular element, the geometric characteristics of the corrugations and a limited weight which facilitates the laying operation as described further on. The condition which has to be respected, in accordance with the present invention, is that each of the tubular elements must possess a greater rigidity than that of the cable.

Another system for increasing the rigidity of the tubular stiffening-means, comprising a plurality of tubular elements, consists in superimposing two or more layers of tubular elements in series, i.e., in practice, two or more layers of shells. Preferably, this is carried out in such a way that the shells of each layer are staggered, in the longitudinal sense, with respect to the shells of the underlying layer, and present a cutting-plane at right angles with respect to the cutting-plane of the shells in the underlying layer.

Figure 4:
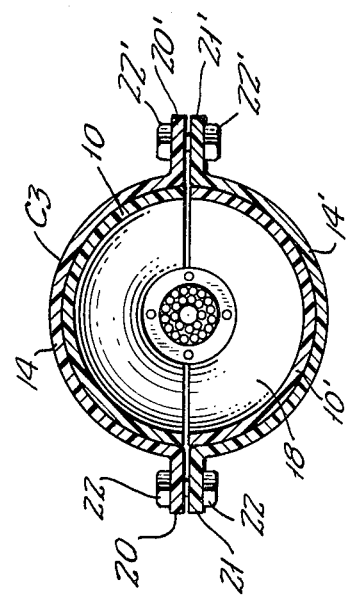
FIG. 4 The cross-section, taken along the plane 4—4 indicated in FIG. 3, of the tubular stiffening-means shown in FIG. 3.

FIG. 4 represents the cross-section, according to the plane 4—4 of FIG. 3, of the submarine electric cable provided with tubular stiffening-means.

In particular, FIG. 4 shows a preferred form of the collar $C_3$ shown in FIG. 3. Said collar $C_3$ comprises two semi-collars 14 and 14', each one having a C-shaped cross-section and, at their extremities, being provided with the respective projecting parts 20, 20' and 21, 21'. Said projecting parts have through-holes which, owing to the opposing of the semi-collars, can be traversed by means suitable for locking together the said projecting parts (for example, the bolts with nuts 22 and 22'). Said projecting parts and said locking-means comprise the means for connecting said semi-collars.

Figure 5:
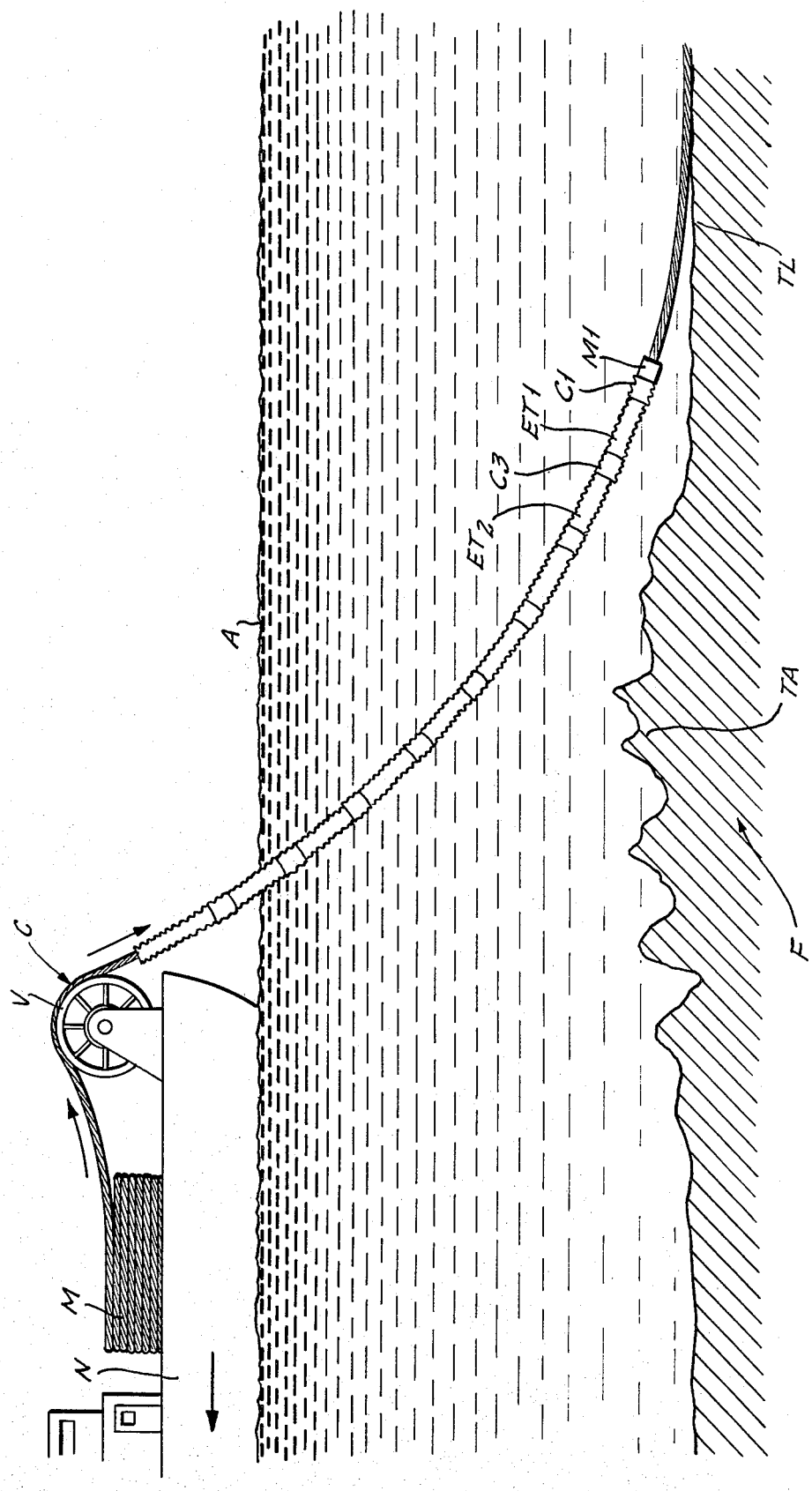
FIG. 5 A side elevation view according to the method of the present invention.

In FIG. 5, there is schematically represented the laying of a submarine electric cable provided with a tubular stiffening-means according to the present invention.

In particular, the cable C can be observed as being laid on the bottom F where a smooth tract TL and an uneven tract TA are found. The cable C, on becoming paid-off from the coil M situated on the bridge of the ship N, passes over the cable capstan V and sinks, through gravity, for being laid on bottom F of the body of water.

Said cable C is provided with a tubular stiffening-means at a portion thereof which is destined for being laid upon the uneven stretch TA of bottom F. According to the present invention, said tubular stiffening-means is assembled around the cable, during the laying operation itself, upon that length of cable comprised between the cable capstan V and the surface A of the water.

The method for carrying out this operation is particularly simple and rapid when the tubular stiffening-means is of the type described in FIGS. 3 and 4 and when the following working sequence is observed:

the first clamp $M_1$ is locked onto the protective covering of the cable;

in contact with said first clamp, there are placed around the cable a first and a second shell that are coupled together for forming the tubular element $ET_1$;

the collar $C_1$ is made to circumscribe the extremity of the tubular element $ET_1$ that is in contact with the said first clamp;

around the cable, at the opposite extremity of said tubular element $ET_1$, are placed two other facing shells, so as to form the tubular element $ET_2$;

the collar $C_3$ is made to circumscribe the contiguous extremities of said tubular elements $ET_1$ and $ET_2$;

using the same mode of operation, a plurality of tubular elements and collars are so disposed as to form a tubular stiffening-means of the length desired; a collar (not shown in FIG. 5) is made to circumscribe the free end of the last tubular elements of said plurality;

a second clamp (not shown in FIG. 5) is locked onto the protective covering of the cable.

As already stated, in accordance with the present invention, said tubular stiffening-means has a greater rigidity than the rigidity of the cable. This signifies that each of the tubular elements composing said tubular stiffening-means has a greater ridigity than that of the cable.

This condition existing, said tubular stiffening-means can be comprised of a plurality of tubular elements all having the same rigidity, or alternatively, of a plurality of tubular elements each of which has a different rigidity.

One practical embodiment, which is particularly convenient and efficacious, consists in disposing at the intermediate part of the plurality of elements, one or more tubular elements having the same rigidity, and, at the terminal parts, one or more tubular elements having a lesser rigidity and which progressively decreases starting from said intermediate part. In this way, the tubular stiffening-means will present a greater flexibility in the terminal parts rather than in the intermediate part. This factor permits the tubular means, itself, to be adaptable to the most convenient development in that zone which can exist between uneven tracts and smooth tracts and, therefore, to accommodate itself with continuity to the cable which has a lower rigidity.

Examples of practical embodiments of submarine electric cables, according to the present invention, have been described hereabove. However, it is to be understood that other possible alternative variations which will be apparent to those skilled in the art are intended to be included within the scope of the invention.

We claim:

1. Submarine electric cable installation on the bottom of a body of water, said bottom having both a relatively smooth tract and a relatively uneven tract, said cable comprising at least one conductor having a screen and insulation therearound and having an outer protective covering around said insulation and said cable having a portion thereof overlying said uneven tract, said installation comprising tubular stiffening means around said portion of said cable and preventing contact of said cable with said uneven tract, said tubular stiffening means having a rigidity greater than the rigidity of said cable and a length sufficient to prevent bending of said portion of said cable to a radius less than the minimum bending radius of said cable, and said tubular stiffening means having at least a portion of its inner wall spaced from said outer protective covering and having openings therin to permit water to flow into and out of and within said tubular stiffening means and thereby cool said cable, and said cable being without said tubular stiffening means therearound at a portion thereof which overlies said relatively smooth tract.

2. Submarine electric cable installation, according to claim 1, characterized by the fact that said stiffening-means is constituted by a material having a specific weight approximating that of said water.

3. Submarine electric cable installation, according to claim 1, characterized by the fact that the specific weight of the material constituting the stiffening-means is less than or equal to 2.8.

4. Submarine electric cable installation, according to claim 3, characterized by the fact that the specific weight of said material is about 1.5.

5. Submarine electric cable installation, according to claim 1 characterized by the fact that said tubular stiffening-means comprises a plurality of tubular elements in series to one another, each one of said tubular elements having a greater ridigity than that of the cable.

6. Submarine electric cable installation, according to claim 5, characterized by the fact that the intermediate ones of said plurality of tubular elements have a rigidity greater than the rigidity of opposite end ones of said plurality of tubular elements, the rigidity of said opposite end ones progressively decreasing in the direction from said intermediate ones toward the ends of said tubular stiffening means.

7. Submarine electric cable installation, according to claim 5, characterized by the fact that the surface of each one of said tubular elements has annular corrugations.

8. Submarine electric cable installation, according to claim 7, characterized by the fact that each one of said tubular elements comprises a first shell and a second shell, each having a C-shaped cross section, and connecting means for connecting said first and second shells in opposed relation, and further comprising means for connection the contiguous ends of said shells, and means on each first shell and each second shell for maintaining said cable coaxial to each one of said tubular elements.

9. Submarine electric cable installation, according to claim 8, characterized by the fact that said connecting means are collars.

10. Submarine electric cable installation, as in claim 9, characterized by the fact that the surfaces of said collars have annular corrugations.

11. Submarine electric cable installation, according to claim 9, characterized by the fact that said collars each comprise a first and a second semi-collar each having a C-shaped cross-section and means for connecting each semi-collar to the other semi-collar.

12. Submarine electric cable installation, according to claim 11, characterized by the fact that said means for connecting said first and second semi-collars comprise protuberances extending from said first and second semi-collars, and means clamping opposing protuberances together.

13. Submarine electric cable installation, according to claim 5, characterized by the fact that said tubular stiffening-means comprise two or more superimposed layers of tubular elements in series and composed of shells, the shells of each layer being staggered in the longitudinal sense with respect to the shells of the underlying layer and presenting a cutting-plane at right angles with respect to the cutting-plane of the shells in the underlying layer.

14. Submarine electric cable installation, according to claim 5, characterized by the fact that said tubular elements are made of polyester reinforced with fibreglass.

15. Submarine electric cable installation, which comprises at least one insulated and screened conductor and a protective covering which is placed at the depth of a body of water where both smooth and uneven tracts are to be found, characterized by the fact of comprising a tubular stiffening-means disposed around said cable in correspondence to each of said uneven tracts, said tubular stiffening-means having a greater rigidity than the rigidity of the said cable and having an inner diameter which is greater than the outer diameter of said cable, and centering elements between said tubular stiffening means and said cable maintaining said cable co-axially inside said stiffening-means, the interspace, between the outer wall of said cable and the inner wall of said tubular stiffening-means, being occupied by water from the surrounding water.

16. Submarine electric cable installation, according to claim 15, characterized by the fact that said tubular stiffening-means is disposed longitudinally between a first and a second clamp fastened onto the protective covering of the cable, said first and second clamps each having an outer diameter at least equal to the outer diameter of said tubular stiffening-means.

17. Method for disposing a tubular stiffening-means around a submarine electric cable having a protective covering during the laying of the cable from a ship on water, said ship having a cable capstan and said tubular stiffening-means being assembled around the cable portion between said capstan and the water during the laying of the cable in the water, characterized by the fact of comprising the following operations:

locking, onto the protective covering of the cable, a first clamp that has its outer diameter at least equal to the outer diameter of said tubular stiffening-means;

disposing around the cable a first and a second shell having C-shaped cross-sections and annular corrugations, for forming a first tubular element that is in contact with said first clamp;

circumscribing with a first collar the extremity of said first tubular element that is adjacent said first clamp, said first collar comprising a first and a second semi-collar having C-shaped cross-sections and annular corrugations, said first and second semi-collars having corrugations that are similar to the corrugations of said first and second shells, and the inner projecting parts of said corrugations of said first and second semi-collars becoming inserted into the outer corresponding depressions of the corrugations of said first and second shells;

disposing around the cable a third and a fourth shell having C-shaped cross-sections and annular corrugations, for forming a second tubular element in series to said first tubular element;

circumscribing with a second collar the adjacent extremities of said first and second tubular elements in series, said second collar comprising a third and a fourth semi-collar having C-shaped cross-sections and annular corrugations that are similar to the corrugations of said shells, the inner projecting parts of the corrugations of said second collar being placed in correspondence of the outer depressions of the adjacent terminal corrugations of said first and second contiguous tubular elements;

disposing, using the same steps, a plurality of additional tubular elements and collars around the cable, for forming a tubular stiffening-means of the desired length;

circumscribing with another collar the end of the last tubular element of said plurality; and locking, on said protective covering of the cable, a second clamp that has its outer diameter at least equal to the outer diameter of said tubular stiffening-means.

* * * * *